A. W. WIGGLESWORTH.
DRIVING GEAR MECHANISM.
APPLICATION FILED MAY 31, 1907.
972,587.
Patented Oct. 11, 1910.
5 SHEETS—SHEET 5.
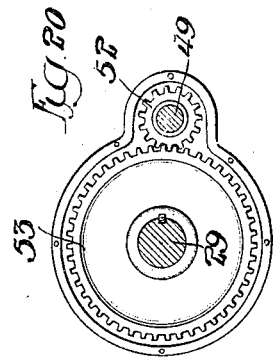
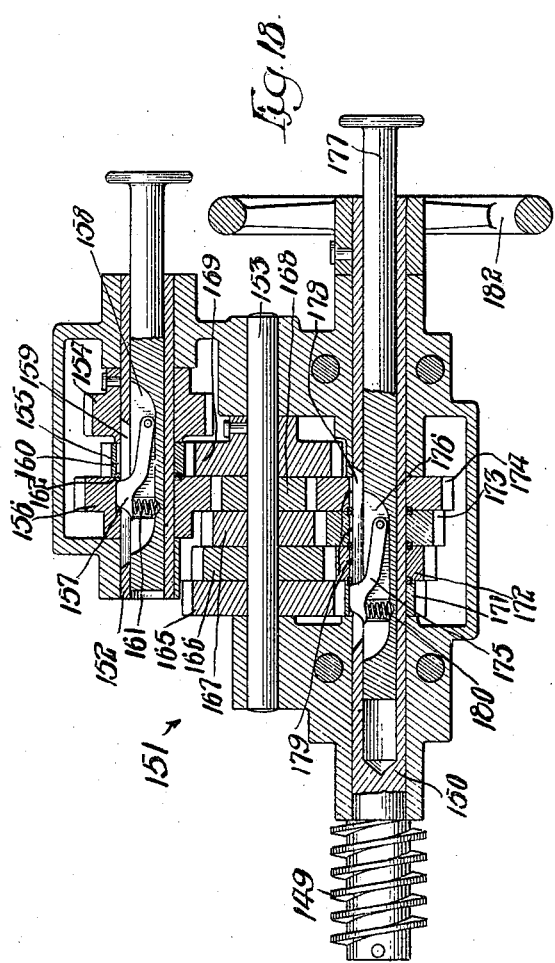
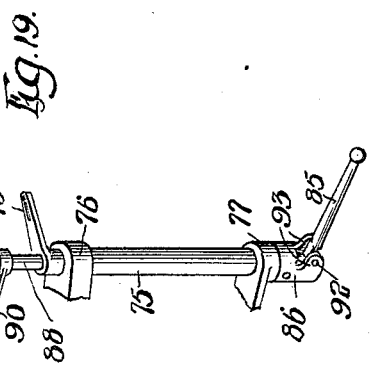
Witnesses:
Inventor:
Albert W. Wigglesworth
by Poole & Brown
Attys.

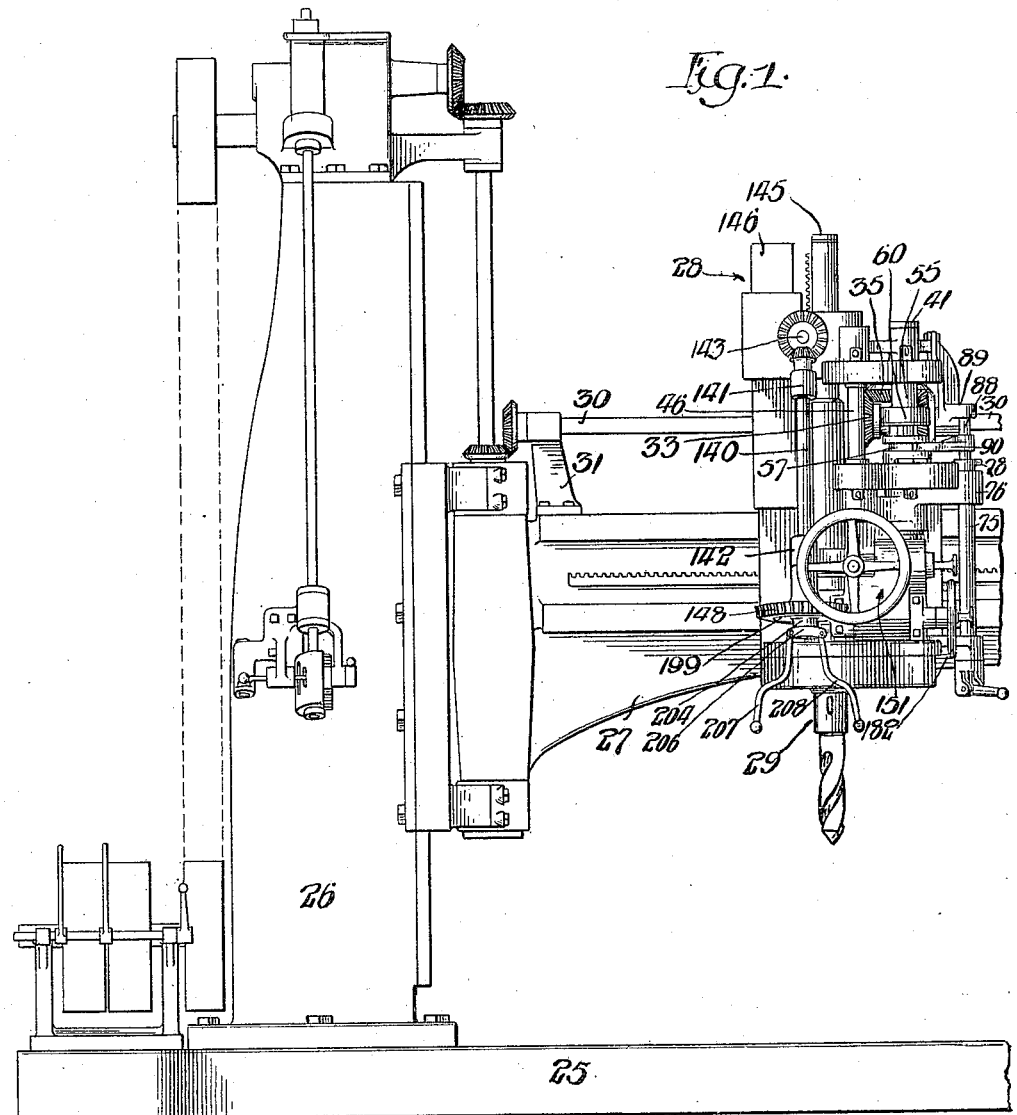

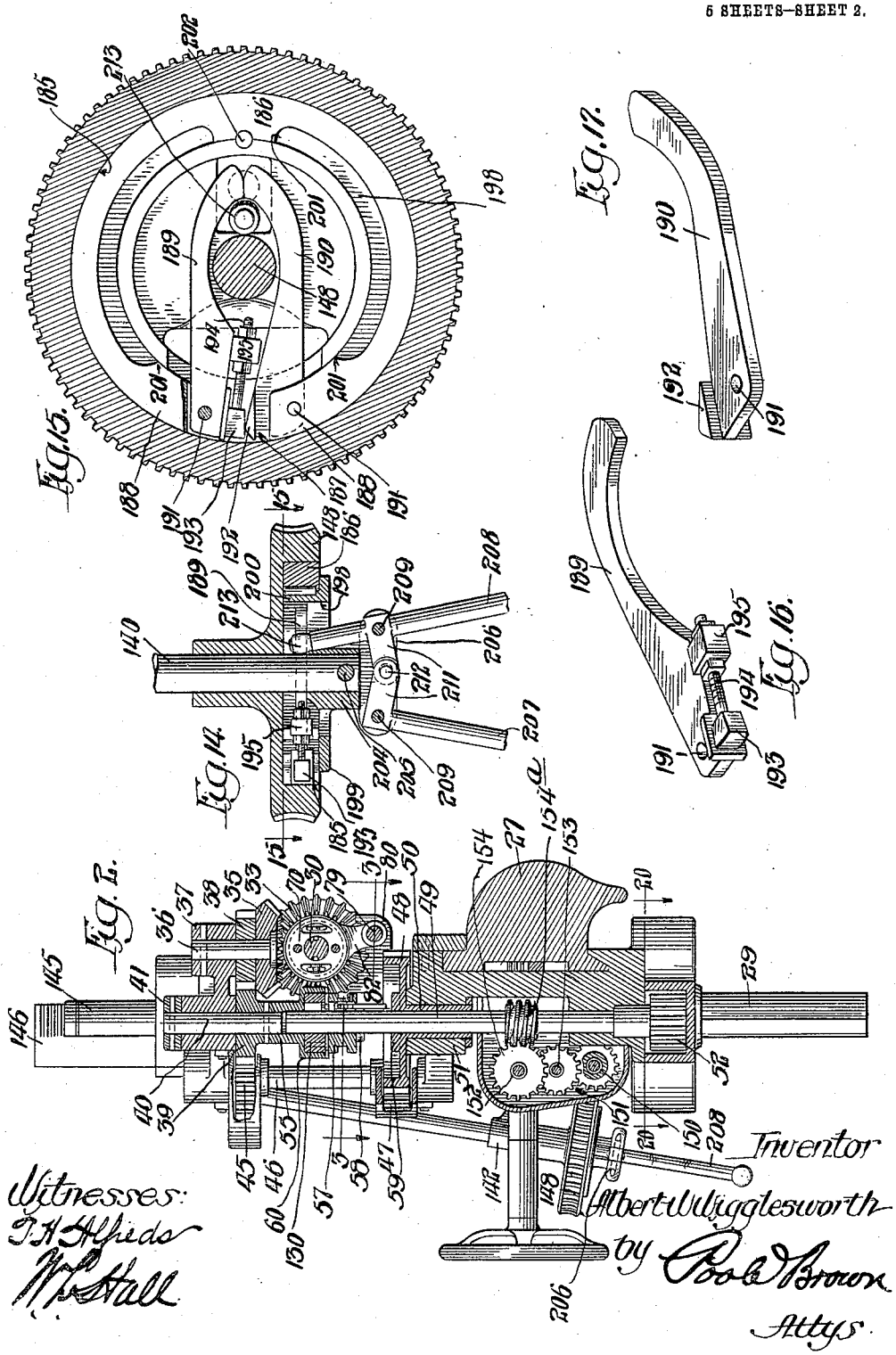

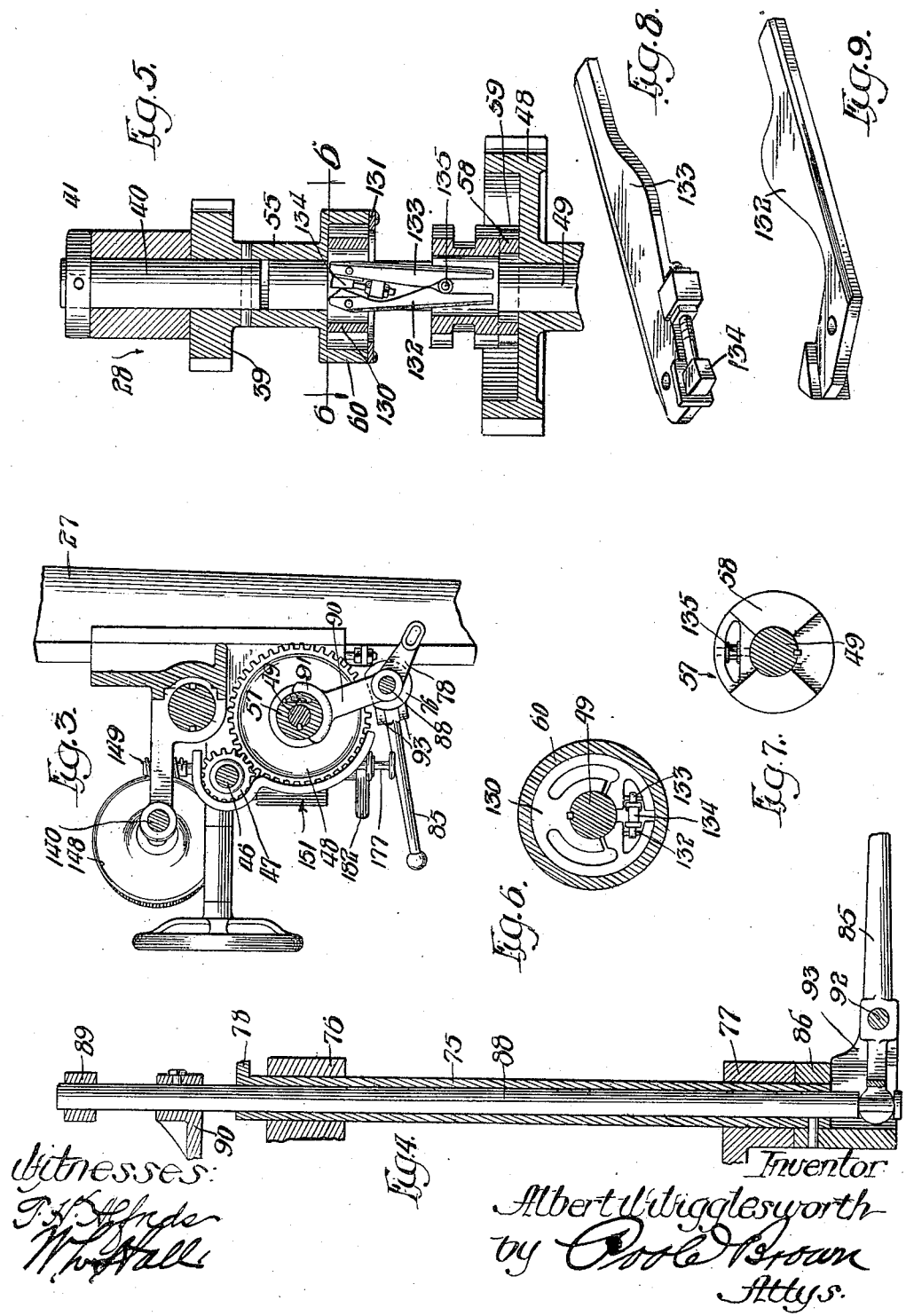

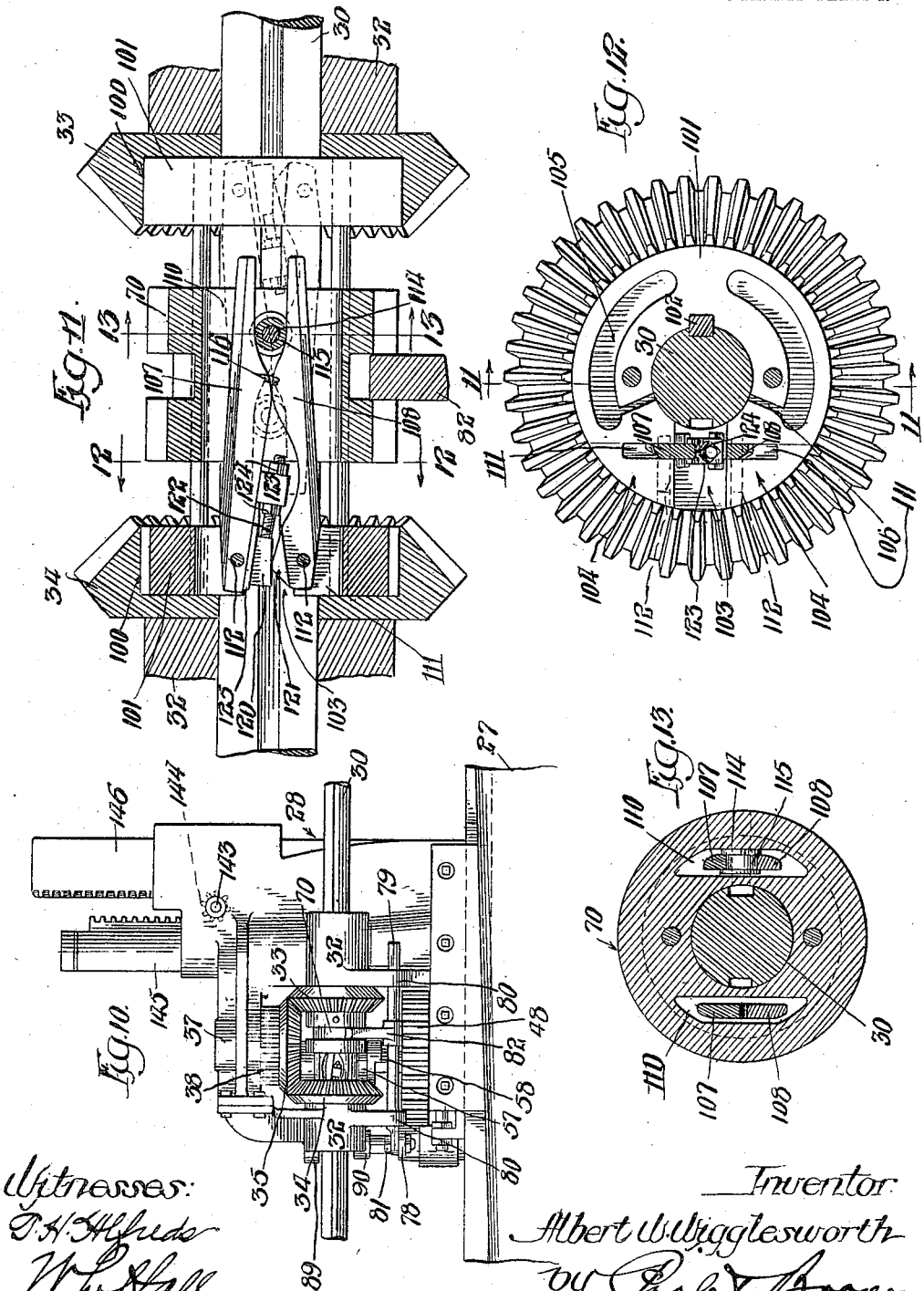

UNITED STATES PATENT OFFICE.

ALBERT W. WIGGLESWORTH, OF CHICAGO, ILLINOIS.

DRIVING-GEAR MECHANISM.

972,587.  Specification of Letters Patent.  Patented Oct. 11, 1910.

Application filed May 31, 1907. Serial No. 376,686.

*To all whom it may concern:*

Be it known that I, ALBERT W. WIGGLESWORTH, a citizen of the United States, and a resident of Chicago, in the county of Cook and State of Illinois, have invented certain new and useful Improvements in Driving-Gear Mechanisms; and I do hereby declare that the following is a full, clear, and exact description thereof, reference being had to the accompanying drawings, and to the letters of reference marked thereon, which form a part of this specification.

This invention relates to improvements in driving gear mechanism for drilling and other machines and the invention consists in the matters hereinafter set forth and more particularly pointed out in the appended claims.

My improvements are herein shown as applied to a radial drill of the general type illustrated in my prior United States Letters Patent No. 725,645, granted April 14, 1903, but may be applied to control the driving gear mechanism of other drilling and analogous machines.

Among the objects of my invention is to improve the construction and operation of the mechanism for controlling the transmission of power to the tool spindle and the devices for manually controlling said mechanism, thereby facilitating the operation of the machine, and to otherwise improve the construction and operation of driving gear mechanism of this general character.

In the drawings:—Figure 1 is a side elevation of a drilling machine embodying my invention. Fig. 2 is a vertical sectional view of the drill-head, showing the gearing for transmitting power to the drill spindle and a portion of the feed mechanism. Fig. 3 is a horizontal section, taken on line 3—3 of Fig. 2. Fig. 4 is a longitudinal section of the operating shaft for controlling the operation of the drill spindle. Fig. 5 is an enlarged detail section of the countershaft illustrated in Fig. 2, illustrating clutch devices for locking it to associated parts of the high and low speed gears. Fig. 6 is a section, taken on line 6—6 of Fig. 5. Fig. 7 is a bottom plan view of a spool or collar constituting part of the clutch shown in Fig. 5. Figs. 8 and 9 are perspective views of the clutch actuating fingers shown in place in Fig. 5. Fig. 10 is a fragmentary rear view of the machine, showing a portion of the driving and reversing mechanism for the drill spindle. Fig. 11 is an enlarged central longitudinal section of the clutch devices shown in elevation in Fig. 10, the section being taken on line 11—11 of Fig. 12. Figs. 12 and 13 are cross-sections, taken on lines 12—12 and 13—13, respectively, of Fig. 11. Fig. 14 is a fragmentary view of the feed worm-wheel and its shaft, showing the clutch for locking the worm-wheel to the shaft. Fig. 15 is an enlarged section, taken on line 15—15 of Fig. 14. Figs. 16 and 17 are perspective views of the clutch actuating fingers shown in Fig. 15. Fig. 18 is a central vertical section of a change speed gear associated with the feed mechanism. Fig. 19 is a perspective view of the operating shafts shown in Fig. 4, illustrating the connection thereof with the parts which they operate. Fig. 20 is a horizontal section, taken on line 20—20 of Fig. 2.

As shown in the drawings, 25 designates the base of the machine, 26 a column supported on said base, and 27 designates an arm extending radially from said column and supported thereon to be adjusted vertically in any well known manner. Said arm carries the drill-head, indicated as a whole by 28, which is movable longitudinally of the arm and in which is rotatively mounted the tool spindle 29, and which also embodies and supports the mechanism for driving said tool spindle and feeding the same to its work.

Power is transmitted to the head from the driving mechanism of the machine through a horizontal shaft 30 which, for the purpose of this disclosure will hereinafter be known as the driving shaft. Said shaft is mounted at one end in a bearing 31 rising from the arm 27 (Fig. 1) and at its other end in bearings 32, supported on or made part of the head (Fig. 10). Mounted on said driving shaft 30 are two opposing beveled gear wheels 33, 34 (Figs. 2 and 10) which are normally loose on the shaft and are adapted to be alternately fixed thereto by means of suitable clutch mechanism mounted on the shaft between the same and hereinafter described. Said beveled gear wheels 33, 34 mesh with an interposed beveled gear wheel 35 rotatively mounted on a stud 36 (Fig. 2) that is fixed or supported in a projection 37 of the head. Located above and rotating with said gear wheel 35 is a spur-gear wheel 38 that meshes with a pinion 39 fixed to a short vertical shaft 40 rotatively mounted in the head (Figs. 2 and 5) said shaft being supported or suspended from a collar 41 that is fixed to the upper end thereof and bears on an upwardly facing part of the head. The pinion 39 meshes with a gear wheel 45 fixed to the upper end of a short shaft 46 rotatively mounted in suitable bearings in the head. Said shaft carries at its lower end a pinion 47 that meshes with a large gear wheel 48 which loosely surrounds a countershaft 49 disposed in alinement with the stub-shaft 40. Said gear wheel 48 is provided with a downwardly projecting hub 50 that surrounds said shaft and is rotatively mounted in a suitable bearing 51 of the head. Mounted on the lower end of the countershaft 49 is a pinion 52 that meshes with a large horizontal gear wheel 53 (Fig. 20) which is non-rotatively fixed to the drill spindle 29.

The pinion 39 is provided with a downwardly extending hub 55 (Figs. 2 and 5) which extends below the shaft 40 to which it is attached and is provided with a vertical bore constituting a bearing for the upper end of the countershaft 49. Sliding on said countershaft 49 above the gear wheel 48 and non-rotative thereon is a clutch spool 57. Said spool is provided on its lower end with clutch teeth 58 adapted to engage clutch teeth 59 formed on the upper face of said gear wheel 48, whereby, when said spool is lowered by the mechanism hereinafter described to bring said clutch teeth into engagement, the wheel 48 is locked to the countershaft 49 to rotate therewith. Said sleeve extension 55 of the pinion 39 is enlarged at its lower end to constitute an annular inclosing casing of a friction clutch, the construction of which clutch will be hereinafter described, and the said spool 57 carries clutch operating fingers which, when said spool is moved to its uppermost position, brings said friction clutch into action to connect the countershaft directly to the pinion 39. It will be observed from the foregoing that when said countershaft is thus connected with the gear pinion 39 power is transmitted directly from the driving mechanism associated with the pinion 39 to drive the tool spindle at the highest speed. When, however, said spool 57 occupies its lowermost position with the teeth thereof engaged with the clutch teeth on the upper face of the gear wheel 48, said latter gear wheel is locked to the countershaft. At this time also said countershaft is released from its direct connection with the pinion 39. Power to drive the drill spindle is therefore transmitted from said pinion 39 through the speed reducing gears 45, 47 and 48, thereby driving the spindle at slow speed and correspondingly high power. When the clutch spool occupies its upper position to lock the countershaft to the pinion 39 the drill spindle is driven directly at a high speed and correspondingly reduced power.

As before stated, the bevel gears 33, 34 on the driving shaft 30 are adapted to be alternately locked to the shaft by means of a suitable clutch mechanism, thereby providing means for connecting the drill spindle with and disconnecting it from the power and for reversing the drill spindle. The clutch mechanism includes a sliding spool or collar 70 mounted on the shaft 30 between said gear wheels 33 and 34 and so arranged that it may be moved to a central or neutral position to disconnect the drill spindle from power or to one or the other of its limits of movement to lock either one of the gear wheels to the driving shaft. In the present instance it may be assumed that when the beveled gear wheel 33 is locked to the shaft the shaft drives the tool spindle forwardly and when the beveled gear wheel 34 is locked to the shaft the tool spindle is reversed.

One of the objects of my present invention is to provide mechanism, embracing a single manually operable part, for shifting the driving shaft clutch to drive the drill spindle either forwardly or backwardly or move the clutch to its neutral position and for connecting the drill spindle with the high or low speed, either when running forwardly or reversed. Thus all of the various operations of the drill with respect to driving the drill forwardly and reversing it at either high or low speed may be directed by the use of a single hand of the operator, leaving the other hand free to direct the feeding operation.

Before referring to the specific construction of the clutches operated by the spool 70 on the main shaft and the spool 57 on the countershaft, I will describe the arrangement of the manually operable part which actuates these clutches.

75 (Figs. 1, 4 and 19) designates a vertical hollow rock-shaft that is mounted at its upper and lower ends in bearings 76, 77, extending laterally from the drill head frame. Said shaft extends both above and below its bearings. Fixed to or formed on the upper end of said hollow shaft is an arm 78 that extends rearwardly therefrom and is adapted for connection with a short horizontal sliding rod 79 (Fig. 10) located in rear and below the clutch spool 70 of the main shaft. Said rod slides in suitable bearings 80, 80 formed on the head frame. The said arm 78 of the rock-shaft is slotted, as shown in Fig. 3, and the connection between the arm and said rod comprises a bolt 81 extending through an aperture in the flat end of the rod and said slot of the rock-shaft arm. The sliding rod 79 carries a fork 82 which engages the groove of the clutch spool 70 in the manner clearly shown in Fig. 10, whereby sliding movement of the rod 79, transmitted thereto through the rock-shaft, acts to shift said clutch spool. The said rock-shaft is provided at its lower end with a horizontally disposed operating lever 85 that is pivoted to an extension or head 86 carried by the lower end of the rock-shaft. It is through the medium of said operating arm or lever that the rock-shaft is turned on its vertical axis to shift the clutch spool 70 in the manner described. Contained within said hollow rock-shaft 75 is a reciprocating shaft 88 which has bearing in said hollow rock-shaft and in a bearing arm or lug 89 above said rock-shaft. The said reciprocating shaft 88 carries at its upper end above the hollow rock-shaft a horizontally directed arm 90 (Figs. 3 and 19) provided at its end with a fork 91 engaging the groove of the grooved clutch spool 57 associated with the countershaft 49. Said reciprocating shaft is moved upwardly in its bearing through the medium of the same lever 85 by which the rock-shaft is rotated on its axis. For this purpose, said arm 85 is pivoted to swing vertically by means of a pivot pin 92 to laterally extending arms 93, 93 of the lower enlarged end or head 86 of said hollow rock-shaft. The said arm 85 extends beyond its pivot into said enlarged head and is forked to embrace the lower reduced end of the reciprocating shaft. By swinging the actuating lever 85 downwardly, the said shaft 88 is raised, thereby shifting the clutch collar 57 upwardly and clutching the countershaft to the sleeve or hub of the pinion 39 to effect direct drive. When the lever 85 is swung upwardly the shaft 88 is lowered thus lowering the clutch spool 57 and clutching the gear wheel 48 to the countershaft and thereby driving the drill spindle through the reduced speed gearing. Thus it will be observed that by the simple horizontal and vertical movements of the lever 85 the drill spindle may be connected with and disconnected from the power and reversed and the parts may be driven to transmit power to the drill spindle direct or through the slow speed gear. An important advantage of this arrangement is that all the movements described may be effected by one hand of the operator, thus leaving the other hand free to direct the feeding mechanism, and each clutch may be operated independently of the other clutch, thus enabling the speed of the drill spindle to be varied without disconnecting the drill spindle from the power.

The clutch mechanisms for alternately connecting the opposing bevel gear wheels 33, 34 with the driving shaft and for connecting the countershaft 49 with the sleeve or hub of the pinion 39 have the same general features of construction. Said clutch mechanism will now be described.

Referring first to the clutch mechanism for connecting the driving and reversing gear wheels 33, 34 with the drive shaft, which is a double clutch and is operated by movement of the clutch spool 70 in both directions from a central or neutral position, the same is shown in Figs. 10 to 13, inclusive, and is made as follows: The said gear wheels 33, 34 are cut away on their inner faces to produce recesses having cylindric inwardly facing friction walls 100. Contained within the recess of each gear is an expansible clutch member 101 having a cylindric exterior friction surface adapted to be forced into frictional engagement with the friction surface of the gear wheel. Said clutch member 101 may be said to be a ring, but, however, of peculiar form. It comprises a circular plate that is fixed by a key 102 to the driving shaft 30 (Fig. 12). It is cut away on one side from its periphery to its bore, as indicated at 103, so that the parts at the opposite sides of said cut away portion constitute what may be termed two arms 104, 104 of the clutch ring that are adapted to be spread outwardly to bring their outer cylindric surfaces into frictional contact with the inner cylindric surface 100 of the recess of the gear. The said clutch member is cut away at 105, 106, in the manner shown in Fig. 12, so as to weaken the same and to admit the arms 104 thereof being spread outwardly by the power available for the purpose, while affording a central part by which the member may be firmly attached to the shaft 30. The parts which have been termed the arms of the clutch ring swing outwardly, by reason of the spring of the metal of the ring, about that part of the ring located opposite to the cut away portion 103. The means for spreading the arms of said clutch member outwardly against the co-acting friction surface of the wheel consists of swinging fingers 107, 108 which are disposed parallel with and at one side of the shaft 30. There are two of these fingers connected with each main shaft clutch mechanism, one pair being located on one side of the shaft and the other on the other side thereof as indicated in full and dotted lines in Fig. 11. The fingers of each pair occupy recesses or openings 110, 111, respectively, in the clutch spool 70 and the clutch member 101. The said opening 111 in the clutch member opens into the space 103 dividing the arms of the clutch member, and the fingers 107, 108, partially occupy said openings 111 and said space or recess 103. The said fingers are pivoted in said openings 111 to the arms of the clutch ring by means of pivot pins 112 and are fulcrumed one on the other near their pivoted ends in such manner that when the opposite ends of the fingers are separated the lever action of the fingers acts to spread the arms or members of the clutch ring outwardly to bring the cylindric friction surfaces into frictional or clutching relation and thereby lock the wheel to the shaft. For the purpose of thus spreading the free ends of the pivoted clutch fingers, a pin 114 is provided which projects laterally from one side wall of the opening 110 of the clutch spool 70 into the space between the free ends of the fingers and said stud is provided with a bearing roller 115 which engages the inner or adjacent margins of said fingers. Said inner or adjacent margins of the fingers are formed to provide curved lateral extensions 116 having their convex surfaces facing inwardly and meeting at a point between the pivots of the fingers and the spreading or opening pin 114 at a time when the clutch fingers are in their normal or inactive positions. Thus when the clutch spool 70 is moved endwise with respect to the fingers, the bearing roller 115 acts on the curved margins of said lateral extensions 116 to separate said fingers with the result of expanding the clutch member 101 in the manner stated. The fulcrums of said clutch fingers are located in a plane just outside the plane of the axes of the pivot studs 112 and the proportions of the fingers are such, with respect to their fulcrums and the application of power that the fingers act with a powerful effect to expand the clutch ring or member and thus afford a particularly efficient and reliable engagement of the clutch members.

An important feature of this construction lies in the employment of means for adjusting the fulcrum ends of the fingers to compensate for wear between the friction surfaces of the clutch members so as to be able to always press said friction surfaces against each other with uniform force notwithstanding wear of said surfaces. The means shown for effecting this adjustment consists of a wedge block 120 interposed between the fulcrum ends of the fingers with its inclined faces bearing against the inner faces of said fingers. The said inclined faces of the adjusting block converge inwardly toward the opening pin 114 carried by the clutch spool. Said block is carried by one of the fingers, the finger 107, as herein shown, and the other finger is provided with a conical or pointed projection 121, constituting the fulcrum of said finger, and which bears against the adjacent inclined face of said adjusting block. Inasmuch as the block is carried by the finger 107 the inclined face of the block engaged by the projection 121 constitutes the fulcrum point of said fingers 107 and 108. The said adjusting block is attached to the finger 107 by means of a screw-threaded shank 122 thereon which extends through the aperture of an apertured lug 123 formed on said finger and is fixed thereto by means of locking nuts 124, 124. The inclined face of said block opposite that which engages the projection 121 of the finger 108 lies flat against a flat flange 125 on the finger 107 and slides inwardly on said flange when adjusted inwardly. By movement of said block inwardly, through the action of the adjusting and locking nuts 124, the device may be adjusted to take up the wear of the friction surfaces of the clutch elements, and the arrangement and construction of this adjustment is such as to provide for taking up the wear of said parts for the effective life of said clutch ring or member 101.

The clutch device for locking the countershaft 49 to the sleeve or hub extension 55 of the pinion 39 is practically identical with that of the clutch device described. It is shown in Figs. 5 to 9, inclusive, and is made as follows:

130 designates an expanding clutch member having an exterior cylindric friction surface engaging an interior cylindric friction surface of the casing 60 on the end of the sleeve or hub extension 55. Said expanding clutch member is held in the casing by a confining ring 131 attached to the lower margin of said casing (Fig. 5). Clutch actuating fingers 132, 133 extend into and engage said clutch member, and are equipped with an adjusting wedge or block 134 as in the construction before described. Said fingers are spread outwardly to actuate the clutch member by means of a pin 135 carried by the clutch spool 57. In this construction when said clutch spool is moved upwardly through the action of the reciprocating shaft 88 the lower ends of the clutch actuating fingers are spread apart to actuate the clutch member 130 in the same manner as are the like parts operated by movement of the clutch spool 70 before referred to.

Next referring to the construction of the feed mechanism by which the tool is fed to its work either automatically or by hand, these parts are made as follows:

140 designates a feed shaft arranged obliquely in front of the drill-head and mounted in upper and lower bearings 141, 142, extending forwardly from the head (Figs. 1 and 2). The upper end of said shaft is geared to a short horizontal shaft 143 that carries the pinion 144, shown in dotted lines in Fig. 10, which meshes with rack teeth on the drill spindle quill 145, and a sliding counterweight 146 both of which have sliding bearing in the head. The construction last referred to is shown and described in my aforesaid prior United States Letters Patent No. 725,645 and need not be further referred to here. The said feed shaft carries at its lower end a worm-wheel 148 which meshes with a worm 149 (Figs. 2 and 18) carried by the secondary shaft 150 of a variable speed gear designated as a whole by 151. The said variable speed gear embraces a suitable frame in which is rotatively mounted said secondary shaft 150, a primary shaft 152 parallel with the secondary shaft and a short intermediate shaft 153. The primary shaft carries a worm-wheel 154 which is fixed to the shaft and meshes with a worm 154ª suitably fixed to the countershaft 49 of the drill spindle driving mechanism. Said primary shaft carries two other gear wheels 155, 156 of different diameters. They are loosely mounted on the primary shaft and are adapted to be locked thereto by means of a sliding key 157 that is pivotally mounted in a recessed portion 158 of a sliding adjusting pin contained within the hollow primary shaft, said shaft being made hollow to receive the pin. Said key is adapted to project outwardly through a longitudinally arranged slot 159 in the hollow primary shaft to engage notches 160 formed on the inner faces of the bores of said gear wheels, whereby the gear wheels may be severally locked to said shaft. The key is normally pressed outwardly through the slot by means of a spring 161 interposed between the free end of the key and the bottom of the recess. Said gear wheels are separated by collars 162 shown as set in recesses in the adjacent faces thereof and constitute divisions or partitions between the notches 160 of said gear wheels. Said collars and the key are so arranged that the key is automatically forced out of engagement with the notches of said wheel against the action of the spring 161, as when the adjusting pin is moved endwise in the shaft, the key passes the collars, and in the continued endwise movement of the pin the key slides off the partition collars into engagement with the slot 160 of the next wheel to be locked to the shaft. The slot 159 of the primary shaft is made of such length as to permit the key to be shifted entirely out of line with the gears 155, 156 so as to allow the shaft to rotate in said gears. The intermediate shaft 153 carries a cone gear consisting of the varied diameter parts 165, 166, 167, 168 and an additional gear 169 placed, as shown, adjacent to the smallest diameter gear 168 of the cone gear. All of the gears 165 to 169, inclusive, are fixed to the shaft 153 and rotate with each other. The gears 168 and 169 mesh, respectively, with the gears 155, 156. On the secondary shaft 150 are mounted four varied diameter gears 171, 172, 173, 174, which mesh, respectively, with the gears 165, 166, 167 and 168 of the cone gear carried by the intermediate shaft. Said gears 171 to 174, inclusive, are loosely mounted on the secondary shaft and are adapted to be severally locked to said shaft to rotate therewith by means of a key 175 pivotally mounted in a recess 176 of a key actuating pin 177 which is contained within and has sliding engagement with the bore of said shaft, the shaft being made hollow to receive the pin. The locking end of said key extends outwardly through a longitudinal slot 178 in the hollow secondary shaft for engagement with notches 179 in the bores of the gears 171 to 174, inclusive, and is pressed outwardly in position to engage said notches by means of a spring 180. The operation of the key and its adjusting pin 177 is the same as the like parts associated with the primary shaft, it being evident that by sliding said pin inwardly or outwardly the key may be made to engage with the notches of either of the gears and thereby severally lock the gears to said hollow secondary shaft.

It will be observed that the arrangement herein shown provides for eight different speeds of the feed shaft, and the proportions of the several gears are such that the variations of speeds from one limit to the other is gradual. Said secondary shaft is provided with a hand-wheel 182 by which it may be rotated to turn the feed shaft by hand when the gears mounted on said shaft are released therefrom.

The worm-wheel 148 of the feed shaft 140 is mounted on said shaft in such manner as to be capable of rotating loosely thereon and is adapted to be locked to rotate with the shaft by a suitable clutch mechanism hereinafter to be described, whereby power to rotate the feed shaft to feed the tool to its work is transmitted through the variable speed mechanism. When the worm-wheel is loose on the feed shaft the shaft is adapted to be rotated by hand to quickly retract the tool from or advance it to the work. The clutch device for locking the worm-wheel to the feed shaft is generally like the clutch devices heretofore described, it being modified to an extent to adapt it to a different location and manner of operation.

The feed worm wheel is recessed on its under side to provide a chamber having a cylindric inwardly facing surface 185. Contained within said chamber is a clutch member or ring 186 the outer cylindric surface of which is adapted for frictional engagement with the inner cylindric surface 185 of the chamber or recess of the worm wheel. The said ring or clutch member is divided at 187, thus constituting the parts of the ring at each side of said division two spring arms 188, which are adapted to be spread apart to bring the cylindric friction surfaces thereof into frictional engagement with the cylindric inner surface 185 of the worm-wheel. Such spreading of the spring arms is effected by means of clutch actuating fingers 189, 190. Said clutch actuating fingers 189, 190, in this instance, are contained within the recess or chamber of the worm wheel and lie within the plane of the clutch ring. Said clutch actuating fingers enter at their outer ends suitable notches formed in the ends of the spring arms of the clutch ring and they are pivoted to said arms by pivot pins 191. Said fingers are fulcrumed one upon the other as in the construction heretofore described, the finger 190 being provided with a sharp conical shaped projection 192 which fits against a wedge block 193 interposed between the ends of the fingers and carried by the finger 189. The inclined faces of said wedge block converge inwardly toward the free ends to the clutch actuating finger. Said wedge block is adjustably fixed by a screw-shank 194 to a lug 195 formed on said finger 189, and is adjusted in the manner of the clutch actuating fingers before described to compensate for the wear of the friction surfaces of the clutch ring and wheel. The ends of the fingers remote from the fulcrum are cut away or curved outwardly to provide space for the feed shaft 140 which extends between the fingers and the extreme ends of said fingers are curved toward each other and meet in the plane of the axis of said shaft.

198 designates a spider frame comprising a flat plate 199 which fits against the lower side of the clutch ring and is provided with a curved flange 200, concentric with the axis of the worm-wheel and extending into the space surrounded or inclosed by the clutch ring. Said flange closely fits inwardly projecting parts or lugs 201 of said ring, as shown in Fig. 15, whereby it is held in place. In order to prevent said spider and clutch ring angularly shifting one relatively to the other the said parts are provided at the point of contact of the flange of said spider with one of the projections 201 of the clutch ring with an opening formed half in one part and half in the other, and a pin 202 fits in said opening to afford an interlocking connection between the parts. Said spider is provided with a central depending hub 204 which fits upon the end of the feed shaft below the worm-wheel and the spider is fixed to the shaft by means of a pin 205 extending transversely through said hub and shaft. Depending from said hub is a cross-head or flange 206. 207, 208 designate hand levers which are pivoted by means of pins 209 to the ends of said cross-head. The said hand levers 207, 208 constitute means whereby the feed shaft may be rotated to advance or retract the drill spindle when the clutch associated with the worm wheel 148 is released. The hand lever 208 is provided with an upward extension 210 which extends upwardly between the inwardly curved ends of the clutch fingers 189, 190, as shown in Figs. 14 and 15 and said extension is provided at its upper end with a bearing roller 213 that engages the inner curved margins of said fingers. When said levers are pressed together, therefore, the upper extended end 210 of the lever 208 swings outwardly and acts to spread or force the curved ends of the clutch actuating fingers outwardly, thereby setting the clutch to lock the worm wheel to the shaft. When the free ends of the levers 207, 208 are spread apart the clutch is released and said levers serve, in this position, as handles whereby the feed shaft may be rotated by hand. Suitable means are provided for locking the levers 207, 208 in position to hold the clutch in its locking position, comprising, in this instance, rigid arms 211, 211 on said levers extending toward each other and pivotally joined by a pin 212 extending transversely through the overlapping ends thereof. Thus when said levers are swung together the pivoted ends of said arms are raised above a plane passed through the pivot studs 209 thus locking the levers from spreading outwardly.

It will be observed that the countershaft 49 is located in front of the radial arm 27 which supports the drill-head and is connected at its upper end with the driving means by gear mechanism located also in front of said arm, and that the parts are so arranged that the power to rotate the drill spindle is communicated directly thereto through the gear wheel 53 at the larger diameter of said spindle and closely adjacent to the work. This is an important structural feature inasmuch as the power is applied to the drill spindle so close to the tool carried thereby as to avoid an objectionable torsional stress on the spindle such as occurs when the power to drive the drill spindle is applied thereto at a point distant from the work, or when power is applied to the spindle at a point of reduced diameter as occurs in many drilling machines. This construction also avoids the transmission to the driving gears of torsional vibration of the drill spindle caused by the drill jumping or chattering in the work.

The means for controlling the drill feed shaft and for driving the tool spindle by gear connections with the drill or tool spindle near the lower or tool end of the latter are not herein claimed, but such subject matter is claimed in my application for United States Letters Patent, Serial No. 502,428 filed on the 16th day of June, 1909, and which is a division of the present application.

I claim as my invention:—

1. The combination with a tool spindle and its drive shaft, of a driving gear mechanism between said shaft and spindle including a variable speed mechanism, and also a clutch device arranged to connect the drive shaft with said driving mechanism to drive the spindle forwardly and to reverse the same, of a hollow rock-shaft operatively connected with said clutch device to actuate the same, a reciprocable shaft within said hollow rock-shaft and operatively connected with the variable speed mechanism, and a lever pivoted to the lower end of the rock-shaft to rock the same and arranged to engage the reciprocable shaft to reciprocate the latter when said lever is swung on its pivot.

2. The combination with a tool spindle and its drive shaft, of a driving gear mechanism between said shaft and spindle including a variable speed mechanism, and also a clutch device arranged to release said drive shaft from the driving mechanism and to connect said drive shaft thereto to drive the tool spindle forwardly and to reverse the same, said variable speed mechanism embracing a second clutch device operating to drive the spindle at varying speeds, a rock-shaft connected with and operating one of said clutch devices, a reciprocable shaft connected with and operating the other clutch device, and a pivoted lever mounted on said rock-shaft to rock the same and acting upon the reciprocable shaft to give endwise movement to the latter, and arranged to actuate each clutch device independently of the other.

3. The combination with a tool spindle and its drive shaft, of driving gear mechanism between said shaft and spindle including a variable speed mechanism, and also a clutch device arranged to release said drive shaft from the driving mechanism and to connect said drive shaft thereto to drive the spindle forwardly and to reverse the same, said variable speed mechanism embracing a second clutch device operating to drive the spindle at varying speeds, a tubular rock-shaft connected with and operating one of said clutch devices, a reciprocable shaft within the tubular rock-shaft and connected with and operating the other clutch device, and a lever pivotally mounted on said rock-shaft and acting upon the reciprocable shaft to give endwise movement to the latter.

4. The combination with a tool spindle and its horizontal drive shaft, of driving mechanism between said shaft and spindle including a variable speed mechanism, and also a horizontally movable clutch device on the drive shaft arranged to release said drive shaft from the driving mechanism and to connect the said shaft thereto to drive the spindle forwardly and to reverse the same, said variable speed mechanism embracing a vertically movable clutch device operating to drive the spindle at varying speeds, a vertically arranged hollow rock-shaft connected at its upper end with said horizontally movable clutch device, a reciprocable shaft mounted within said hollow rock-shaft and connected at its upper end with said vertically movable clutch device, and a single operating lever for rocking and reciprocating said shafts, for the purpose set forth.

5. The combination with a horizontal drive shaft and a tool spindle, of two opposing beveled gear wheels loosely mounted on said drive shaft, a third beveled gear wheel meshing with said opposing beveled gear wheels, a clutch device adapted to connect either of said opposing beveled gear wheels to said drive shaft, a countershaft geared to and rotating said tool spindle, a pinion geared to said third beveled gear wheel and provided with a hub in which the upper end of the countershaft has bearing, a gear wheel loosely mounted on said countershaft below said pinion and geared to said pinion to constitute part of a variable speed mechanism, a second clutch device operating to separately connect said latter gear wheel and said pinion to the countershaft, and a single manually operable lever for operating both of said clutch devices.

In testimony, that I claim the foregoing as my invention I affix my signature in the presence of two witnesses, this 22 day of May A. D. 1907.

ALBERT W. WIGGLESWORTH.

Witnesses:
 GEORGE R. WILKINS,
 T. H. ALFREDS.